United States Patent [19]

Hecker et al.

[11] Patent Number: 5,925,702
[45] Date of Patent: Jul. 20, 1999

[54] INNERLINER FOR PNEUMATIC TIRES

[75] Inventors: Kenneth Carl Hecker, Mogadore; Richard Robinson Smith, Cuyahoga Falls, both of Ohio

[73] Assignee: The Goodyear Tire & Rubber Company, Akron, Ohio

[21] Appl. No.: 09/005,252

[22] Filed: Jan. 9, 1998

Related U.S. Application Data

[62] Division of application No. 08/707,835, Sep. 6, 1996, Pat. No. 5,755,899
[60] Provisional application No. 60/003,720, Sep. 13, 1995.
[51] Int. Cl.$^6$ ............................. C08J 5/10; C08K 3/34; C08L 9/06
[52] U.S. Cl. .................... 524/449; 524/495; 524/451
[58] Field of Search ................... 524/449, 451, 524/430, 322, 270, 495, 496

[56] References Cited

U.S. PATENT DOCUMENTS

| | | | |
|---|---|---|---|
| 3,245,453 | 4/1966 | Barton et al. | 152/330 |
| 4,157,320 | 6/1979 | Yankner et al. | 260/28.5 |
| 4,400,485 | 8/1983 | Mukamal et al. | 524/444 |
| 5,178,702 | 1/1993 | Frerking, Jr. et al. | 152/510 |

FOREIGN PATENT DOCUMENTS

| | | | |
|---|---|---|---|
| 638803 | 3/1962 | Canada. | |
| 726792 | 1/1966 | Canada. | |
| 1222503 | 2/1971 | United Kingdom | B41N 1/12 |
| 2199329 | 11/1987 | United Kingdom | C08L 9/06 |
| 2198138 | 6/1988 | United Kingdom. | |
| 9422680 | 10/1994 | WIPO | B60C 1/00 |

*Primary Examiner*—James J. Seidleck
*Assistant Examiner*—U. K. Rajguru
*Attorney, Agent, or Firm*—Alvin T Rockhill

[57] ABSTRACT

It has been unexpectedly found that certain blends of styrene-butadiene rubber and platey filler exhibit both good gas barrier properties and good tensile fatigue properties. These blends accordingly have the requisite characteristics for a tire innerliner material. They offer the advantage of being much less expensive than halobutyl rubbers which can be employed for the same purpose. The present invention more specifically discloses a pneumatic tire having an integral innerliner wherein said innerliner is comprised of a blend of (1) from about 40 phr to about 99 phr of a first styrene-butadiene rubber having a bound styrene content of about 15 percent to about 30 percent, (2) from about 1 phr to about 60 phr of a high styrene content styrene-butadiene rubber having a bound styrene content of about 40 percent to about 60 percent, and (3) from about 40 phr to about 125 phr of platey filler. The subject invention also discloses a pneumatic tire having an integral innerliner wherein said innerliner is comprised of (1) a styrene-butadiene rubber having a bound styrene content of about 15 percent to about 30 percent, and (2) from about 125 phr to about 200 phr of platey filler.

13 Claims, No Drawings

INNERLINER FOR PNEUMATIC TIRES

This application is a Divisional of application Ser. No. 08/707,835, filed on Sep. 6, 199 now U.S. Pat. No. 5,755,899, which claims the benefit of U.S. Provisional application No. 60/003,720, filed on Sep. 13, 1995.

BACKGROUND OF THE INVENTION

The inner surface of a pneumatic tire is typically comprised of an elastomeric composition designed to prevent or retard the permeation of air and moisture into the carcass from the tire's inner air chamber. It is often referred to as an innerliner. Innerliners have also been used for many years in most tubeless pneumatic vehicle tires to retard or prevent the escape of air used to inflate the tire, thereby maintaining tire pressure for extended periods and eliminating the need to frequently pump air into the tire.

Rubbers, such as butyl and halobutyl rubber, which are relatively impermeable to air are often used as a major proportion of innerliners. For instance, U.S. Pat. No. 2,676,636 discloses the use of butyl rubber as a highly air-impermeable innerliner for tires. Halobutyl rubbers are frequently employed as innerliners because they offer both excellent gas barrier properties and low temperature flexural properties.

The innerliner is normally prepared by conventional calendering or milling techniques to form a strip of uncured compounded rubber of appropriate width which is sometimes referred to as a gum strip. Typically, the gum strip is the first element of the tire applied to a tire building drum, over and around which the remainder of the tire is built. When the tire is cured, the innerliner becomes an integral, co-cured, part of the tire. Tire innerliners and their methods of preparation are well known to those having skill in such art.

Halobutyl rubber is generally the most expensive rubber used in a tire. Given the competitive tire market and the continued need to lower the cost of manufacturing tires without sacrificing properties, there exists a need to eliminate or substantially decrease the cost of innerliners. In response to this need over the years a number of alternatives to halobutyl rubber innerliners have been developed. For example, U.S. Pat. No. 4,549,593 discloses a innerliner composition which is comprised of a blend of natural rubber and halogenated butyl rubber. British Patent 2,198,138 indicates that the need for an innerliner can be eliminated by utilizing a blend of styrene-butadiene rubber and a rubber which promotes adhesiveness, such as natural rubber, as the tire carcass.

U.S. Pat. No. 5,091,467 discloses an elastomeric barrier material which can be utilized as the innerliner of a tire. The barrier material disclosed therein is a melt blend of syndiotactic-1,2-polybutadiene, a terpolymer of ethylene, vinyl acetate, and vinyl alcohol, and a compatibilizing agent.

U.S. Pat. No. 5,178,702 discloses a pneumatic rubber tire having an integral innerliner comprising a top layer and rubber laminate having at least three layers wherein (a) at least two of said three layers are barrier layers each comprised of a sulfur-cured rubber composition containing, based on 100 parts by weight of rubber,
100 parts by weight of acrylonitrile/diene copolymer having an acrylonitrile content ranging from 30 to 45 percent and from 25 to 150 parts by weight of a platy filler selected from the group consisting of talc, mica and mixtures thereof; and (b) the thickness of each barrier layer containing 100 parts by weight of acrylonitrile/diene copolymer ranges from 25 microns to 380 microns; and (c) interdispersed between the two barrier layers of sulfur-cured rubber containing 100 parts of acrylonitrile/diene copolymer is at least one nonbarrier layer of a sulfur-cured rubber selected from the group consisting of natural rubber, halogenated butyl rubber, styrene/butadiene rubber, cis-1,4-polybutadiene, cis-1,4-polyisoprene, styrene/isoprene/butadiene rubber, butyl rubber and mixtures thereof.

SUMMARY OF THE INVENTION

It has been unexpectedly determined that various blends of styrene-butadiene rubber and platey filler exhibit both good gas barrier properties and good tensile fatigue properties. These blends accordingly have the requisite characteristics for a tire innerliner material. Styrene-butadiene rubber and platey filler are relatively inexpensive. These blends accordingly offer the advantage of being much less expensive than halobutyl rubbers which can be employed for the same purpose.

The present invention more specifically discloses a pneumatic tire having an integral innerliner wherein said innerliner is comprised of a blend of (1) from about 40 phr to about 99 phr of a first styrene-butadiene rubber having a bound styrene content of about 15 percent to about 30 percent, (2) from about 1 phr to about 60 phr of a high styrene content styrene-butadiene rubber having a bound styrene content of about 40 percent to about 60 percent, and (3) from about 40 phr to about 125 phr of platey filler.

The subject invention also reveals a pneumatic tire having an integral innerliner wherein said innerliner is comprised of (1) a styrene-butadiene rubber having a bound styrene content of about 15 percent to about 30 percent, and (2) from about 125 phr to about 200 phr of platey filler.

The present invention further reveals a barrier composition which is comprised of a blend of (1) from about 40 phr to about 99 phr of a first styrene-butadiene rubber having a bound styrene content of about 15 percent to about 30 percent, (2) from about 1 phr to about 60 phr of a high styrene content styrene-butadiene rubber having a bound styrene content of about 40 percent to about 60 percent, and (3) from about 40 phr to about 125 phr of platey filler.

The subject invention also discloses a barrier composition which is comprised of (1) a styrene-butadiene rubber having a bound styrene content of about 15 percent to about 30 percent, and (2) from about 125 phr to about 200 phr of platey filler.

DETAILED DESCRIPTION OF THE INVENTION

In one embodiment of this invention the barrier composition is made utilizing only styrene-butadiene rubber having a bound styrene content which is within the range of about 15 percent to about 30 percent. This styrene-butadiene rubber will more typically have a bound styrene content which is within the range of about 20 percent to about 25 percent. In these barrier compositions it is critical for about 125 phr (parts by weight per 100 parts by weight of rubber) to about 200 phr of platey filler to be present to attain the desired physical and gas barrier properties. At least about 125 phr of the platey filler is required to attain good gas barrier properties. On the other hand, tensile fatigue characteristics become unacceptable when the level of platey filler exceeds about 200 phr.

It has been determined that a maximum of about 100 phr of platey filler can be blended into the styrene-butadiene rubber utilizing conventional mixing equipment, such as a Banbury mixer. In cases where more than 100 phr of the platey filler are mixed into the rubber it will be necessary to blend the platey filler into the rubber with a twin-screw extruder.

In another embodiment of this invention the barrier composition is made utilizing two different styrene-butadiene rubbers. The first styrene-butadiene rubber has a bound styrene content which is within the range of about 15 percent to about 30 percent. This styrene-butadiene rubber will more typically have a bound styrene content which is within the range of about 18 percent to about 25 percent. The second styrene-butadiene rubber employed in the blend has a high bound styrene content which is within the range of about 40 percent to about 60 percent. This high styrene content styrene-butadiene rubber will more typically have a bound styrene content which is within the range of about 45 percent to about 55 percent.

These barrier compositions will typically contain from about 40 phr to about 99 phr of the first styrene-butadiene rubber and from about 1 phr to about 60 phr of the high styrene content styrene-butadiene rubber. In most cases these barrier compositions will contain from about 45 phr to about 80 phr of the first styrene-butadiene rubber and from about 20 phr to about 55 phr of the high styrene content styrene-butadiene rubber. It is normally preferred for such barrier compositions to contain from about 50 phr to about 70 phr of the first styrene-butadiene rubber and from about 30 phr to about 50 phr of the high styrene content styrene-butadiene rubber. These barrier compositions will also contain from about 40 phr to about 125 phr of platey filler. It will be more typical for these compositions to contain from about 50 phr to about 110 phr of the platey filler. In most cases it is preferred for these barrier compositions to contain from about 75 phr to about 100 phr of the platey filler. To facilitate the mixing of the barrier composition in conventional mixing equipment, such as a Banbury mixer, the level of platey filler can be maintained below about 100 phr. In such cases the level of platey filler will be within the range of about 40 phr to about 99 phr. In such cases the level of platey filler will preferably be within the range of about 50 phr to about 99 phr and will most preferably be within the range of about 75 phr to about 99 phr.

The platey filler will typically be a mineral silicate, such as talc or a mica. Talc is a finely powdered native hydrous magnesium silicate which is sometimes also referred to as talcum or French chalk. The micas which can be employed are also hydrous silicates. Some representative examples of micas which can be utilized include biotite, muscovite, phlogopite, and zinnwaldite.

The barrier compositions of this invention can be utilized as innerliners for pneumatic tires. In practice such barrier compositions are initially prepared as an uncured compounded rubber gum strips, constructed as an inner surface (exposed inside surface) of an uncured rubber tire structure (carcass), and sulfur co-cured with the tire carcass during the tire curing operation under conditions of heat and pressure. Thus, the innerliner becomes an integral part of the tire by being co-cured therewith as compared to being a simple adherent laminate. Because the integral innerliner is strongly bonded to the carcass it can be extended over the bead area. This can lead to greatly improved gas barrier properties because air in the tire cannot escape as readily through the bead area. It should be noted that butyl rubber innerliners often are not extended over the bead area due to poor adhesion characteristics and a fear that the innerliner could separate from the carcass if contorted during tire building and/or mounting operations.

It is to be understood that the barrier compositions of this invention can be compounded with conventional rubber compounding ingredients, such as sulfur, carbon black, zinc oxide, stearic acid, processing oils, accelerators, and antidegradants. The compounded barrier composition is then typically extruded and/or calendered to form the uncured gum strip. Such rubber compounding materials and methods are well known to those having skill in such art.

The innerliner typically has an uncured gum thickness which is within the range of about 0.03 to about 0.1 inches (0.08 to 0.25 cm), depending somewhat on the tire size, its intended use and degree of air retention desired. The uncured tire carcass rubber interface with which the innerliner is sulfur co-cured can be of various sulfur curable rubbers and rubber blends, such as polybutadiene rubber, synthetic polyisoprene rubber, natural rubber, or styrene-butadiene rubber. The pneumatic tire with the integral innerliner composition can be constructed in the form of a passenger tire, truck tire, aircraft tire, agricultural tire, or any other type of bias or radial tire.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1–5

In this series of experiments, a styrene-butadiene rubber having a bound styrene content of 23.5 percent was compounded with various levels of talc. The oxygen permeability of each of the blends relative to a butyl rubber-based innerliner and their tensile fatigue characteristics were measured. The level of talc incorporated, the relative oxygen permeability, and the tensile fatigue characteristics determined are reported in Table I.

TABLE I

| Example | Talc (phm) | Permeability | Fatigue |
|---------|-----------|--------------|---------|
| 1 | 50 | 6.8 | Pass |
| 2 | 88 | 4.6 | Pass |
| 3 | 130 | 3.0 | Pass |
| 4 | 172 | 2.4 | Pass |
| 5 | 215 | 2.0 | Fail |

Permeability is reported in Table I as oxygen permeability relative to a butyl rubber based innerliner compound having a value of 1.0. Fatigue is reported on a pass-fail basis as tensile fatigue as measured at −40° C.

As can be seen the gas barrier characteristics of the styrene-butadiene rubber blend improved with increasing levels of talc. However, tensile fatigue characteristics failed at a 215 phr level of talc. Blends which contained from about 125 phr to about 200 phr of talc had a combination of properties which were good for utilization as barrier compositions for tire innerliners. The blend made in Example 4 had an oxygen permeability of only 2.4 relative to a butyl rubber based innerliner compound and still passed the tensile fatigue test.

EXAMPLES 6–12

In this series of experiments, a styrene-butadiene rubber having a bound styrene content of 23.5 percent (low styrene content SBR), a styrene-butadiene rubber having a bound styrene content of 50 percent (high styrene content SBR), and talc were compounded at various levels. The oxygen permeability of each of the blends relative to a butyl rubber-based innerliner and their tensile fatigue characteristics were measured. The level of talc incorporated, the level of the two styrene-butadiene rubbers employed, the relative oxygen permeability, and the tensile fatigue characteristics determined are reported in Table II. Examples 6 and 7 were run as controls. The blend made in Example 6 contained only low styrene SBR (no high styrene content SBR) and the blend made in Example 7 contained only high styrene content SBR (no low styrene content SBR).

TABLE II

| Ex. | High St SBR | Low St SBR | Talc (phr) | Permeability | Tensile Fatigue |
|---|---|---|---|---|---|
| 6 | — | 100% | 50 | 6.8 | Pass |
| 7 | 100% | — | 50 | 1.4 | Fail |
| 8 | 40% | 60% | 50 | 3.6 | Pass |
| 9 | 40% | 60% | 75 | 3.0 | Pass |
| 10 | 40% | 60% | 100 | 2.3 | Pass |
| 11 | 50% | 50% | 50 | 3.3 | — |
| 12 | 50% | 50% | 100 | 2.1 | — |

Permeability is reported in Table II as oxygen permeability relative to a butyl rubber based innerliner compound having a value of 1.0. In Table II tensile fatigue is reported on a pass-fail basis measured at −40° C.

As can be seen the gas barrier characteristics of the blends improved with increasing levels of the high styrene content styrene-butadiene rubber. The blends made in Examples 8–12 had a combination of properties which are good for utilization as barrier compositions for tire innerliners. The blend made in Example 10 had good oxygen permeability characteristics relative to a butyl rubber based innerliner compound and still passed the tensile fatigue test.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A barrier composition which consists of a blend (1) from about 40 phr to about 99 phr of a first styrene-butadiene rubber having a bound styrene content of about 15 percent to about 30 percent, (2) from about 1 phr to about 60 phr of a high styrene content styrene-butadiene rubber having a bound styrene content of about 40 percent to about 60 percent, (3) from 75 phr to about 125 phr of platey filler, (4) carbon black, (5) optionally, zinc oxide, (6) optionally, stearic acid, (7) optionally, a processing oil and (8) optionally, an antidegradant.

2. A barrier composition as specified in claim 1 wherein the platey filler is selected from the group consisting of talc and mica.

3. A barrier composition as specified in claim 2 wherein from 75 phr to about 110 phr of the platey filler is present in said blend.

4. A barrier composition as specified in claim 3 wherein from about 45 phr to about 80 phr of the first styrene-butadiene rubber and from about 20 phr to about 55 phr of the high styrene content styrene-butadiene rubber are included in the blend.

5. A barrier composition as specified in claim 4 wherein the first styrene-butadiene rubber has a bound styrene content which is within the range of about 18 percent to about 25 percent.

6. A barrier composition as specified in claim 5 wherein the high styrene content styrene-butadiene rubber has a bound styrene content which is within the range of about 45 percent to about 55 percent.

7. A barrier composition as specified in claim 6 wherein from about 50 phr to about 70 phr of the first styrene-butadiene rubber and from about 30 phr to about 50 phr of the high styrene content styrene-butadiene rubber are included in the blend.

8. A barrier composition as specified in claim 7 wherein from 75 phr to about 100 phr of the platey filler is present in said blend.

9. A barrier composition as specified in claim 7 wherein from 75 phr to about 99 phr of the platey filler is present in said blend.

10. A barrier composition as specified in claim 7 wherein from about 75 phr to about 99 phr of the platey filler is present in said blend.

11. A barrier composition as specified in claim 1 wherein said platey filer is talc.

12. A barrier composition as specified in claim 1 wherein said platey filler is mica.

13. A barrier composition as specified in claim 12 wherein the mica is selected from the group consisting of biotite, muscovite, phlogopite and zinnwaldite.

* * * * *